United States Patent
Wang et al.

(10) Patent No.: US 9,379,622 B2
(45) Date of Patent: Jun. 28, 2016

(54) POWER CONVERTER AND METHOD FOR CONTROLLING POWER CONVERTER

(71) Applicants: Chou-Sheng Wang, Keelung (TW); Chia-Yo Yeh, Changhua County (TW); Rui-Hong Lu, Chiayi County (TW); Jhih-Da Hsu, New Taipei (TW); Ying-Chieh Su, New Taipei (TW)

(72) Inventors: Chou-Sheng Wang, Keelung (TW); Chia-Yo Yeh, Changhua County (TW); Rui-Hong Lu, Chiayi County (TW); Jhih-Da Hsu, New Taipei (TW); Ying-Chieh Su, New Taipei (TW)

(73) Assignee: Fairchild (Taiwan) Corporation, Taipei (TW)

( * ) Notice: Subject to any disclaimer, the term of this patent is extended or adjusted under 35 U.S.C. 154(b) by 180 days.

(21) Appl. No.: 13/934,242

(22) Filed: Jul. 3, 2013

(65) Prior Publication Data
US 2014/0009976 A1   Jan. 9, 2014

Related U.S. Application Data

(60) Provisional application No. 61/667,462, filed on Jul. 3, 2012.

(51) Int. Cl.
*H02M 3/335* (2006.01)

(52) U.S. Cl.
CPC ...... *H02M 3/33515* (2013.01); *H02M 3/33507* (2013.01); *H02M 3/33592* (2013.01); *Y02B 70/1475* (2013.01)

(58) Field of Classification Search
CPC .......... H02M 3/3515; H02M 3/33553; H02M 3/33569; H02M 3/33576; H02M 3/33507; H02M 3/592

USPC ................. 363/127, 21.18, 95, 234
See application file for complete search history.

(56) References Cited

U.S. PATENT DOCUMENTS

| 5,608,613 | A | 3/1997 | Jansen |
| 6,995,991 | B1 * | 2/2006 | Yang et al. ................ 363/21.14 |
| 7,440,298 | B2 * | 10/2008 | Yang ............................ 363/89 |

(Continued)

FOREIGN PATENT DOCUMENTS

| CN | 101355306 | 1/2009 |
| CN | 101552566 | 10/2009 |

(Continued)

OTHER PUBLICATIONS

"Office Action of Taiwan Counterpart Application", issued on Dec. 2, 2014, p. 1-p. 5.

(Continued)

*Primary Examiner* — Jessica Han
*Assistant Examiner* — Lorena Bruner
(74) *Attorney, Agent, or Firm* — Jianq Chyun IP Office (57) ABSTRACT

A control circuit and a method for controlling a power converter are provided. The method for controlling the power converter includes the following steps. A detection signal is received from the secondary side of the power transformer and a first switching signal is generated in accordance with the detection signal. A second switching signal is generated in accordance with the first switching signal. A voltage signal is generated in accordance with the second switching signal. A comparison signal is generated in accordance with the first switching signal and the second switching signal. The voltage signal and the comparison signal are compared for outputting a comparison result. A gate signal is generated in accordance with the detection signal and the comparison result to control on and off states of a synchronization switch.

22 Claims, 5 Drawing Sheets

(56) References Cited

U.S. PATENT DOCUMENTS

| | | | |
|---|---|---|---|
| 2009/0091951 A1* | 4/2009 | Yang et al. | 363/21.06 |
| 2009/0257251 A1* | 10/2009 | Su et al. | 363/21.15 |
| 2010/0014324 A1* | 1/2010 | Yang et al. | 363/21.06 |
| 2010/0124079 A1* | 5/2010 | Yang et al. | 363/21.02 |
| 2011/0305053 A1* | 12/2011 | Lin et al. | 363/95 |
| 2011/0305055 A1* | 12/2011 | Hsu et al. | 363/127 |
| 2012/0033460 A1* | 2/2012 | Yeh et al. | 363/21.18 |

FOREIGN PATENT DOCUMENTS

| | | |
|---|---|---|
| CN | 102185501 | 9/2011 |
| TW | 201203828 | 1/2012 |

OTHER PUBLICATIONS

"Office Action of China Counterpart Application", issued on Mar. 25, 2015, p. 1-p. 10.

* cited by examiner

POWER CONVERTER AND METHOD FOR CONTROLLING POWER CONVERTER

CROSS-REFERENCE TO RELATED APPLICATION

This application claims the priority benefits of U.S. provisional application Ser. No. 61/667,462, filed on Jul. 3, 2012. The entirety of the above-mentioned patent application is hereby incorporated by reference herein and made a part of this specification.

BACKGROUND OF THE INVENTION

1. Field of the Invention

The invention relates to a control circuit, specifically relates to a causal function circuit for a synchronous rectification in a secondary-side controlled power converter to prevent the power converter from gate overlapping.

2. Description of Related Art

An offline power converter includes a power transformer to provide isolation from an AC line voltage to the output of the power converter for safety. In recent development, applying a synchronous rectifier in the secondary side of the power transformer is to achieve a high efficiency conversion for power converters.

In a conventional power converter, a synchronous rectifier control circuit is usually provided to control turning on and turning off of a synchronous rectifier in the power converter.

However, in the conventional technology of the above mentioned power converter, the dead time of causal function will be very sensitive to the system operation frequency in the power converter. For example, a dead time of causal function is designed according to a low operation frequency (ex. 65 kHz) may not be suitable for the system which operates at a higher frequency (ex. 130 kHz), because the dead time period of causal function may be too narrow to prevent gate overlapping. On the other hand, a dead time of causal function is designed according to a high operation frequency may not be suitable for the system which operates at a lower frequency, because the dead time period will be too wide and result in low efficiency of the system.

SUMMARY OF THE INVENTION

The invention discloses a causal function circuit to provide the dead time of a control circuit to control the synchronization rectification of a power converter which does not vary significantly when the operation frequency increases or decreases.

The invention provides a power converter, which comprises a power transformer, a rectifier diode, a synchronization switch, and a control circuit. The power transformer transforms an input voltage into a switching voltage. One node of the rectifier diode and the first node of the synchronization switch are coupled to the secondary side of the power transformer, and the other node of the rectifier diode and the second node of the synchronization switch are coupled to the output node of the power converter. The control circuit is coupled to the rectifier diode and the synchronization switch. The control circuit generates a gate signal to control on and off states of the synchronization switch in responsive to a detection signal received from the secondary side of the power transformer, so that the output of the power converter is generated in accordance with the switching voltage and the gate signal.

In an embodiment of the invention, the control circuit comprising a detection terminal and a gate terminal. The detection terminal is coupled to the one node of the rectifier diode, and the gate terminal is coupled to a control node of a synchronization switch. The control circuit generates a gate signal at the gate terminal to control on and off states of the synchronization switch in responsive to the received detection signal at the detection terminal.

In an embodiment of the invention, the control circuit comprising a sampling circuit, a clearing circuit, a first voltage generation circuit, a second voltage generation circuit, a comparison circuit and a logic circuit. The sampling circuit receives the detection signal and outputs a first switching signal in accordance with the detection signal. The clearing circuit receives the first switching signal and output a second switching signal in accordance with the first switching signal. The first voltage generation circuit generates a voltage signal in accordance with the second switching signal. The second voltage generation circuit generates a comparison signal in accordance with the first switching signal and the second switching signal. The comparison circuit is coupled to the first voltage generation circuit and the second voltage generation circuit, and the comparison circuit compares the voltage signal and the comparison signal to output a comparison result. The logic circuit is coupled to the comparison circuit, and the logic circuit outputs a gate signal in accordance with the detection signal and the comparison result.

In an embodiment of the invention, the first voltage generation circuit comprises a first buffer, a first switch, a first current source and a first capacitor. A base voltage is applied to a positive input terminal of the first buffer, and a negative input terminal of the first buffer is connected to an output terminal of the first buffer. The first node of the first switch is connected to the output terminal of the first buffer, and the second switching signal is applied to a control node of the first switch. The first current source is connected to a second node of the first switch. One end of the first capacitor is connected to the first current source as an output node of the first voltage generation circuit. The other end of the first capacitor is connected to the first node of the first switch and the output terminal of the first buffer.

In an embodiment of the invention, the second voltage generation circuit comprises a second switch, a second current source, a second capacitor, a third switch, a third capacitor and a second buffer. The second switching signal is applied to a control node of the second switch. The second current source is connected to a second node of the first switch. One end of the second capacitor is connected to the second current source. One terminal of a third switch is connected to second current source, and the first switching signal is applied to a control node of the third switch. The third capacitor is connected to another terminal of the third switch. The positive input terminal of the second buffer is connected to the third capacitor, and the negative input terminal of the second buffer is connected to an output terminal of the second buffer.

In an embodiment of the invention, the second voltage generation circuit further comprises a first resistor and a second resistor. One terminal of the first resistor is connected to the output terminal of the second buffer, and the other terminal of the first resistor is connected to a negative input terminal of the comparator as an output node of the second voltage generation circuit. One terminal of the second resistor is connected to the other terminal of the first resistor and the negative input terminal of the comparator.

In an embodiment of the invention, the comparison circuit comprises a comparator. The positive input terminal of the comparator is connected to an output node of the first voltage generation circuit. The negative input terminal of the comparator is connected to an output node of a second buffer. The comparator compares the voltage signal and the comparison signal, and outputs the comparison result to the logic circuit.

In an embodiment of the invention, the logic circuit comprises a first AND gate, a first inverter, a NOR gate, and a flip-flop. The first input terminal of the first AND gate is connected to an output node of the comparison circuit. The detection voltage is applied to an anode node of the first inverter, and a cathode node of the first inverter is connected to a second input terminal of the first AND gate. The first input terminal of the NOR gate is connected to an output node of the first AND gate, and the detection voltage is applied to an second input terminal of the NOR gate. The reset terminal of the flip-flop is connected to an output node of the NOR gate, a clock terminal of the flip-flop is connected to the cathode node of the first inverter, and the gate signal is generated by an output terminal of the flip-flop.

In an embodiment of the invention, the sampling circuit comprises a second inverter, a fourth switch, a third current source, a third inverter, and a second AND gate. The detection signal is transmitted to a control node of the fourth switch through the second inverter. The third current source is connected to the first node of the fourth switch. The first node of the third inverter is connected to the third current source. The second node of the third inverter is connected to the first input terminal of the second AND gate, the detection signal is transmitted to a second input terminal of the second AND gate, and the first switching signal is generated by the output node of the second AND gate.

In an embodiment of the invention, the clearing circuit comprises a fourth inverter, a fourth current source, a fifth switch, a sixth inverter, and a third AND gate. The first switching signal is transmitted to a control node of the fifth switch through the fourth inverter and the fifth inverter. The fourth current source is connected to the first node of the fifth switch. The first node of the sixth inverter is connected to the fourth current source. The second node of the sixth inverter is connected to the first input terminal of the third AND gate. The second input terminal of the third AND gate is connected to a second node of the fourth inverter. The second switching signal is generated by the output node of the third AND gate.

In an embodiment of the invention, the control circuit comprises a clearing circuit, a first voltage generation circuit, a a second voltage generation circuit, a comparison circuit and a logic circuit. The clearing circuit receives a gate signal and output a third switching signal in accordance with the gate signal. The first voltage generation circuit generates a voltage signal in accordance with the gate signal and the detection signal. The second voltage generation circuit generates a comparison signal in accordance with the first switching signal and the second switching signal. The comparison circuit is coupled to the first voltage generation circuit and the second voltage generation circuit, and the comparison circuit compares the voltage signal and the comparison signal to output a comparison result. The logic circuit is coupled to the comparison circuit, and the logic circuit outputs the gate signal in accordance with the detection signal and the comparison result.

In an embodiment of the invention, the first voltage generation circuit comprises a first switch, a sixth switch, a first current source, and a first capacitor. The detection voltage is applied to a control node of the first switch. The gate voltage is applied to the control node of the sixth switch, and the first node of the first switch is connected to the first node of the sixth switch. The first current source is connected to a second node of the sixth switch. One end of the first capacitor is connected to the first node of the first switch as an output node of the first voltage generation circuit to generate a voltage signal.

In an embodiment of the invention, the power converter further comprises a power switch. A first node of the power switch is connected to a primary side of the power transformer, a second node of the power switch is connected to ground, and a drive signal is coupled to a control node of the power switch to control on and off states of the power switch.

In an embodiment of the invention, the first voltage generation circuit further comprises an adjustment capacitor. The adjustment capacitor is coupled to the first node of the first switch and the adjustment capacitor provides capacitance adjustment for the first capacitor.

In an embodiment of the invention, the second voltage generation circuit comprises a second switch, a seventh switch, a second current source, a second capacitor, a third switch, and a third capacitor. The detection voltage is applied to the control node of the second switch. The gate voltage is applied to the control node of the seventh switch. The first node of the second switch is connected to the first node of the seventh switch. The second current source is connected to a second node of the seventh switch. One end of the second capacitor is connected to the first node of the second switch. One terminal of a third switch is connected to the first node of the second switch, and the third switching signal is applied to a control node of the third switch. The third capacitor is connected to another terminal of the third switch as an output node of the first voltage generation circuit to generate a comparison signal.

In an embodiment of the invention, the logic circuit comprises an first AND gate, a first inverter, a NOR gate, and a flip-flop. The first input terminal of the first AND gate is connected to an output node of the comparison circuit. The detection voltage is applied to an anode node of the first inverter, and a cathode node of the first inverter is connected to a second input terminal of the first AND gate. The first input terminal of the NOR gate is connected to the output node of the first AND gate, and the detection voltage is applied to the second input terminal of the NOR gate. The reset terminal of the flip-flop is connected to the output node of the NOR gate. The clock terminal of the flip-flop is connected to the cathode node of the first inverter. The gate signal is generated by an output terminal of the flip-flop.

The invention provides a method for controlling a power converter. The method includes the following steps. A detection signal is received from the secondary side of the power transformer and a first switching signal is generated in accordance with the detection signal. A second switching signal is generated in accordance with the first switching signal. A voltage signal is generated in accordance with the second switching signal. A comparison signal is generated in accordance with the first switching signal and the second switching signal. The voltage signal and the comparison signal are compared for outputting a comparison result. A gate signal is generated in accordance with the detection signal and the comparison result to control on and off states of a synchronization switch. A first node of the synchronization switch is coupled to a secondary side of the power transformer, a second node of the synchronization switch is coupled to an output node of the power converter, and the gate signal is applied to a control node of the synchronization switch.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EXEMPLARY EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
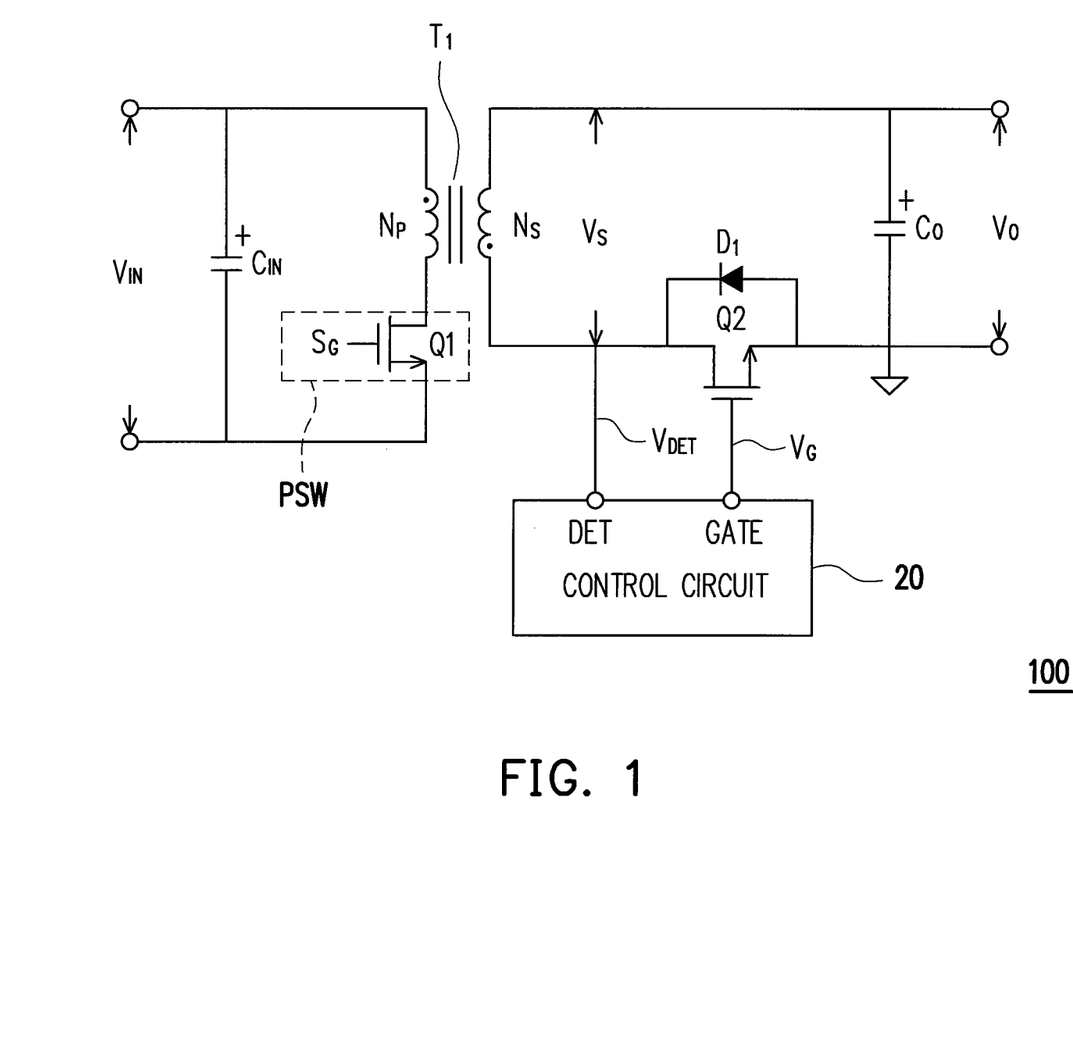
FIG. 1 is a power converter with a secondary feedback using synchronous rectification according to an embodiment of the invention.

FIG. 1 is a power converter 100 with a secondary feedback using synchronous rectification according to an embodiment of the invention. As shown in FIG. 1, a power converter 100 comprises a bulk capacitor $C_{IN}$, a power transformer $T_1$ and a power switch PSW at the primary side $N_P$ of the power transformer $T_1$. The power converter 100 further comprises a rectifier diode $D_1$, a synchronization switch Q2, output capacitor $C_O$ and a control circuit 20 at the secondary side $N_S$ of the power transformer $T_1$. One terminal of the bulk capacitor $C_{IN}$ is connected to the primary side of the power transformer $T_1$, and another terminal of the bulk capacitor $C_{IN}$ is connected to ground. An input voltage $V_{IN}$ is originally stored at a bulk capacitor $C_{IN}$, and is transformed into a switching voltage $V_S$ through the power transformer $T_1$. In other words, the power transformer $T_1$ transforms the input voltage $V_{IN}$ into the switching voltage $V_S$. The power switch PSW is implemented with a power switch transistor Q1 in the embodiment of the invention. In other embodiments of the invention, the person skilled in the art can implement the power switch PSW with another circuit structures. The first node of the power switch PSW (e.g., the drain of the power switch transistor $Q_1$) is connected to the primary side $N_P$ of the power transformer $T_1$, and the second node of the power switch PSW (e.g., the source of the power switch transistor $Q_1$) is connected to ground. A drive signal $S_G$ is coupled to the control node of the power switch PSW (e.g., the gate of the power switch transistor $Q_1$) to control on and off states of the power switch transistor $Q_1$.

A rectifier diode $D_1$ and a synchronization switch Q2 are further provided at the secondary side $N_S$ of the power transformer $T_1$ for rectifying the voltage $V_S$ transformed by the power transformer $T_1$. A cathode of the rectifier diode $D_1$ is coupled to the secondary side $N_S$ of the power transformer $T_1$, and an anode of the rectifier diode $D_1$ is coupled to an output node of the power converter 100 for generating an output voltage $V_O$ in accordance with the switching voltage $V_S$, such as the ground node of the output voltage $V_O$. The first node (e.g., the drain) of the synchronization switch Q2 is connected to the secondary side $N_S$ of the power transformer $T_1$, and the second node (e.g., the source) of the synchronization switch Q2 is also connected to the ground node of the output voltage $V_O$. One terminal of the output capacitor $C_O$ is connected to the secondary side of the power transformer $T_1$, and another terminal of the output capacitor $C_O$ is connected to ground. A control circuit 20 is coupled to the rectifier diode $D_1$ and the synchronization switch Q2 to control on and off states of the synchronization switch Q2. The control circuit 20 comprises a DET terminal coupled to the cathode of a rectifier diode $D_1$, and an GATE terminal coupled to a gate of a synchronization switch Q2. A gate signal $V_G$ is generated at the GATE terminal of the control circuit 20 to control on and off states of the synchronization switch Q2 in responsive to the received detection signal $V_{DET}$ at the DET terminal. That is, the detection signal $V_{DET}$ is received from the secondary side $N_S$ of the power transformer 100.

Figure 2:
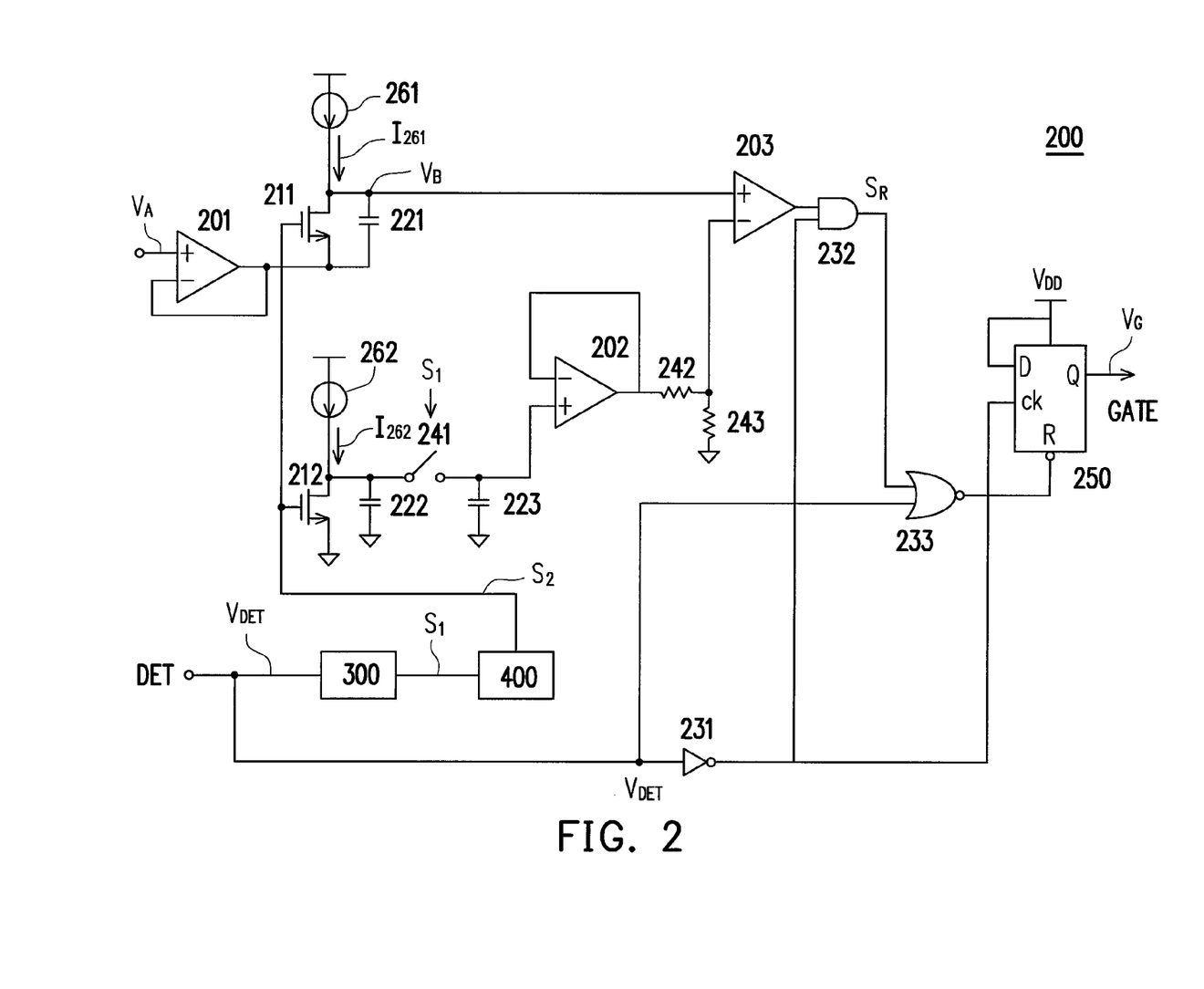
FIG. 2 shows a control circuit in the power converter according to an embodiment of the invention.

A control circuit 200 in FIG. 2 shows an example of the control circuit 20 at FIG. 1 in the embodiment of the present invention, which regulates the dead time of the synchronous rectification switch $Q_2$ in FIG. 1. FIG. 2 shows a control circuit 200 in the power converter 100 according to an embodiment of the invention. The control circuit 200 comprises a first buffer 201 and a second buffer 202, a comparator 203, a first switch 211, a second switch 212, a first capacitor 221, a second capacitor 222 and a third capacitor 223. The control circuit 200 also comprises an AND gate 232, a NOR gate 233, an first inverter 231, and a flip-flop 250. The first input terminal of the AND gate 232 is connected to an output node of the comparator 203. The detection voltage $V_{DET}$ is applied to the anode node of the first inverter 231 and the second input terminal of the NOR gate 233. The cathode node of the first inverter 231 is connected to the second input terminal of the AND gate 232. The first input terminal of the NOR gate 233 is connected to the output node of the AND gate 232. The reset terminal of the flip-flop 250 is connected to the output node of the NOR gate 233. The clock terminal of the flip-flop 250 is connected to the cathode node of the first inverter 231, and the gate signal $V_G$ is generated by the output terminal of the flip-flop 250. In this embodiment, the AND gate 232, the NOR gate 233, the first inverter 231, and the flip-flop 250 form a logic circuit in the control circuit 200 of the disclosure.

A base voltage $V_A$ is applied to a positive input terminal of the first buffer 201. A negative input terminal of the first buffer 201 is connected to an output terminal of the first buffer 201. The output terminal of the first buffer 201 is connected to a first node (e.g., the source) of the first switch 211. A first current source 261 is connected to a second node (e.g., the drain) of the first switch 211 and one end of the first capacitor 221 for charging. The end of the first capacitor 221 is connected to the first current source 261 as an output node of the first voltage generation circuit, and the end of the first capacitor 221 is also connected to the positive input terminal of the comparator 203. The negative input terminal of the comparator 203 is connected to the output node of the second buffer 202 through a resistor 242. The other end of the first capacitor 221 is connected to the source of the first switch 211 and the output terminal of the first buffer 201. The first current source 261 flows through the first capacitor 221 with a current $I_{261}$ and charges the first capacitor 221. In this embodiment, the first buffer 201, the first switch 211, the first capacitor 221, and the first current source 261 form a first voltage generation circuit of the disclosure.

The control node (e.g., the gate) of the first switch 211 is connected to the control node (e.g., gate) of the second switch 212. A second current source 262 is connected to the second node (e.g., the drain) of the second switch 212, and one end of the second capacitor 222 for charging. The terminal of the second capacitor 222 connected to the second current source 262 is also connected to one terminal of a third switch 241. Another terminal of the third switch 241 is connected to one terminal of the third capacitor 223. The terminal of the third capacitor 223 connected to the third switch 241 is also connected to a positive input terminal of the second buffer 202.

The base voltage $V_A$ is applied to the positive input terminal of the first buffer 201, and is applied to the source of the first switch 211 through the first buffer 201. When the first current source 261 flows through the first switch 211 with a current $I_{261}$, it charges the first capacitor 221. A voltage signal $V_B$ is generated at the terminal of the first capacitor 221 which is connected to the first source current 261. Therefore, the voltage signal $V_B$ is the combination of the voltage charged by the first current source 261 and the base voltage $V_A$.

The gate of the first switch 211 and the gate of the second switch 212 are connected together and controlled by a second switching signal $S_2$ generated by a block 400. When the second switching signal $S_2$ is enabled, it turns on the first switch 211 and the second switch 212, and enables the current sources 261 and 262 charge the capacitors 221 and 222. Before charging, the voltage signal $V_B$ already has a base value provided by the base voltage $V_A$. In this embodiment, the second switch 212, the second capacitor 222, the second current source 262, the third switch 241, the third capacitor 223, the second buffer 202 and resistors 242 and 243 form a second voltage generation circuit of the disclosure. One terminal of the first resistor 242 is connected to the output terminal of the second buffer 202, and the other terminal of the first resistor 242 is connected to a negative input terminal of the comparator 203 as an output node of the second voltage generation circuit.

The second current source 262 flows through the second capacitor 222 with a current $I_{262}$ for charging the second capacitor 222. The third switch 241 is controlled by a first switching signal $S_1$ for determining when the voltage on the second capacitor 222 is sampled to the third capacitor 223. The first switching signal $S_1$ is applied to the control node of the third switch 241. Before the third switch 241 closes, the third capacitor 223 stores the voltage of the second capacitor 222 sampled at the previous period. After charging, a comparison signal $V_c$ is generated at a joint of the resistors 242 and 243 by passing the voltage on the third capacitor 223 to a joint of the second buffer 202 and the resistor 242.

After charging, the comparison signal $V_c$ at the negative input terminal of the comparator 203 is shown as the formula (1), wherein T is the system period of the controller 100.

$$V_C = \left[V_B + \frac{I_{261} \times T}{C_{221}}\right] \times \frac{R_1}{R_1 + R_2} \quad (1)$$

The comparator 203 compares the voltage signal $V_B$ and the comparison signal $V_C$, and outputs a high signal (a comparison result) to the AND gate 232 if the voltage signal $V_B$ is higher than the comparison signal $V_C$. In this embodiment, the comparator 203 forms a comparison circuit of the disclosure.

When the detection signal $V_{DET}$ becomes logic-low and the second buffer 202 outputs a logic-high signal, the AND gate 232 outputs a logic-high signal to one of input terminals of the NOR gate 233. Another input terminal of the NOR gate 233 is connected to the DET terminal. A reset signal $S_R$ is produced at the output terminal of the AND gate 232. When the AND gate 232 outputs a logic-low signal, and the detection signal $V_{DET}$ is also logic-low, the NOR gate 233 outputs a logic-high signal to reset the flip-flop 250.

The input terminal of the first inverter 231 is connected to the DET terminal. The output terminal of the first inverter 231 is connected to the flip-flop 250 for turning on the flip-flop 250 when the detection signal $V_{DET}$ is logic-low.

Figure 3:
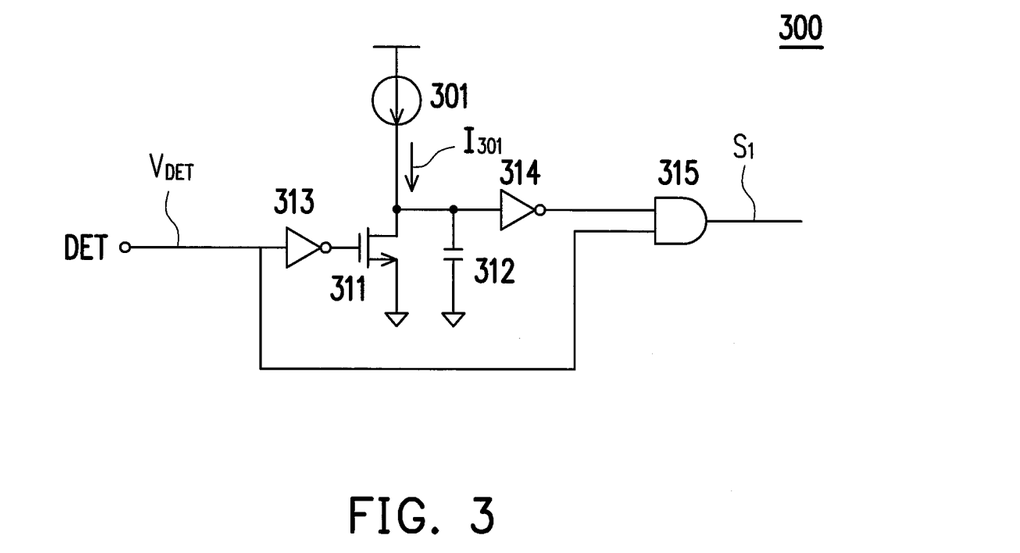
FIG. 3 is a sampling circuit in the control circuit according to an embodiment of the invention.

FIG. 3 is a sampling circuit 300 in the control circuit 200 according to an embodiment of the invention. FIG. 3 shows a construction of the sampling circuit 300, which receives the detection signal $V_{DET}$ and outputs the first switching signal $S_1$ to control the sample time of the third switch 241. The detection signal $V_{DET}$ is transmitted to a control node (e.g., the gate) of a fourth switch 311 through a second inverter 313. The third current source 301 is connected to the first node (e.g., the drain) of the fourth switch 311, and the second node (e.g., the source) of the fourth switch 311 is connected to ground. The first node (e.g., the anode) of the inverter 314 is connected to the third current source 301, and the second node (e.g., the cathode) of the inverter 314 is connected to the first input terminal of the AND gate 315. The detection signal $V_{DET}$ is transmitted to the second input terminal of the AND gate 315. The first switching signal $S_1$ is generated by the output node of the AND gate 315. The capacitor 312 is connected between the third current source 301 and ground.

At first, when the detection signal $V_{DET}$ is enabled from a low state to a high state, the fourth switch 311 is turned off and the third current source 301 flows through the capacitor 312 with a current $I_{301}$ to charge the capacitor 312. The voltage on the capacitor 312 begins to increase from zero to be less than a threshold transit value of an inverter 314. During this time period, the inverter 314 remains to output a high state signal to the AND gate 315, and the first switching signal $S_1$ is in a high state. As a result, the third switch 241 is turned on and the voltage on the second capacitor 222 is sampled to the third capacitor 223. After the voltage on the capacitor 312 reaches the threshold transit value of the inverter 314, the inverter 314 outputs a low-state signal to the AND gate 315, and the first switching signal $S_1$ now is in a low state. The third switch 241 is turned off. Therefore, the sample time of the third switch 241 can be controlled by regulating the voltage on the capacitor 312.

Figure 4:
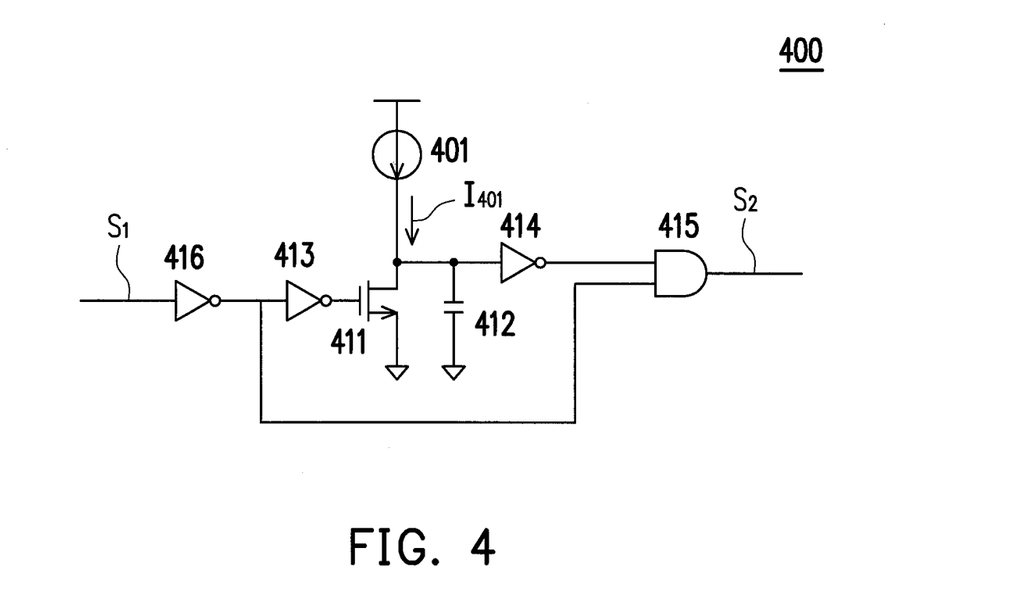
FIG. 4 is a clearing circuit in the control circuit according to an embodiment of the invention.

FIG. 4 is a clearing circuit 400 in the control circuit 200 according to an embodiment of the invention. FIG. 4 shows a clearing circuit 400, which receives the first switching signal $S_1$ and outputs the second switching signal $S_2$. The clearing circuit 400 is configured for clearing the voltages on the first capacitor 221 and the second capacitor 222. The first switching signal $S_1$ is transmitted to the control node (e.g., the gate) of the switch 411 through the inverter 416 and the inverter 413. The current source 401 is connected to the first node (e.g., the drain) of the switch 411. The first node (e.g., the anode) of the inverter 414 is connected to the current source 401. The second node (e.g., the cathode) of the inverter 414 is connected to a first input terminal of the AND gate 415. The second input terminal of the AND gate 415 is connected to a second node (e.g., the cathode) of the inverter 416, and the second switching signal $S_2$ is generated by the output node of the AND gate 415. The capacitor 412 is connected between the current source 401 and ground. When the first switching signal $S_1$ becomes in a high state, the fourth switch 411 is turned on and the fourth current source 401 flows through the fourth switch 411 with a current $I_{401}$ rather than the capacitor 412. Therefore, the inverter 414 outputs a high state to the AND gate 415, and the AND gate 415 outputs a high state. When the first switching signal $S_1$ is in a low state, the fourth current source 401 flows through the capacitor 412 with a current $I_{401}$, and the inverter 414 outputs a low state to the AND gate 415. That is, when the first switching signal $S_1$ is enabled, the clearing circuit 400 outputs a high-state second switching signal $S_2$ to turn on the first switch 211 and the second switch 212. Therefore, the voltages on the capacitors 221 and 222 are discharged.

Figure 5:
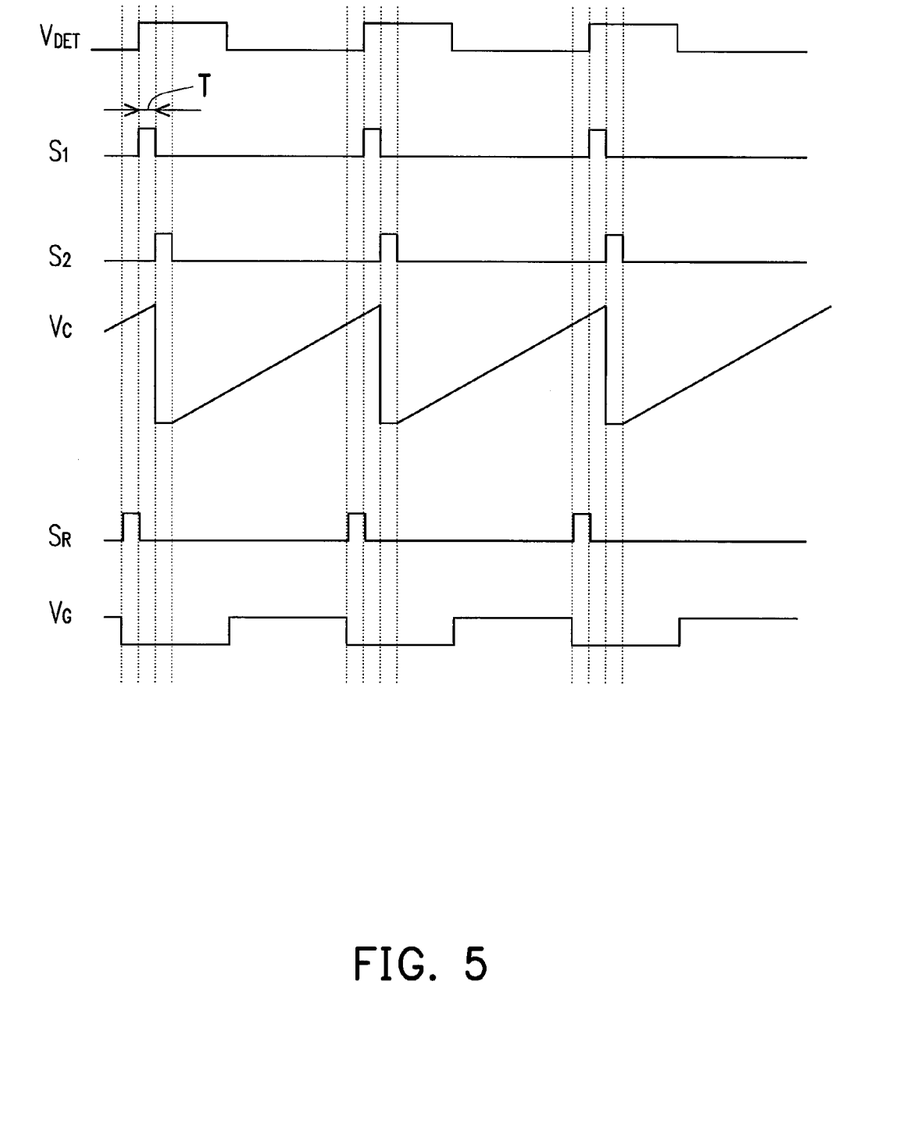
FIG. 5 shows waveforms of major signals according to FIGS. 2-4 of an embodiment of the invention.

FIG. 5 shows waveforms of major signals according to FIGS. 2-4 of an embodiment of the invention. The first switching signal $S_1$ becomes logic-high when the detection signal $V_{DET}$ is logic-high, and remains logic-high for a period T. When the first switching signal $S_1$ becomes logic-low after the period T, the second switching signal $S_2$ becomes logic-high for the period T.

Please refer back to FIG. 2, when the second switching signal $S_2$ is logic-high, the first switch 211 is turned on. The first current source 261 flows through the first switch 211 with a current $I_{261}$, and the first capacitor 221 begins to discharge. The voltage signal $V_B$ becomes the base voltage $V_A$ for the period T when the voltage on the capacitor 221 is cleared by the second switching signal $S_2$. When the second switching signal $S_2$ is logic-low, the second switch 212 is turned off. The first capacitor 221 begins to be charged, and the voltage signal $V_B$ begins to raise at a slope of $I_{261}/C_{221}$. The voltage signal $V_B$ achieves a peak value shown as formula (I).

The comparison signal $V_c$ remains a constant value obtained by sampling the voltage on the second capacitor 222. A reset signal $S_R$ output by the AND gate becomes logic-high when the voltage signal $V_B$ is higher than comparison signal $V_C$, and the detection signal $V_{DET}$ is logic-low at the same time. When the detection signal $V_{DET}$ begins logic-high, the reset signal $S_R$ is logic-low instantaneously.

Because the detection signal $V_{DET}$ will be logic-high when the reset signal $S_R$ begins logic-low, the reset signal $S_R$ avoids that the gate signal $V_G$ and the detection signal $V_{DET}$ transit logic states at the same time. Furthermore, referring to the formula (1), the voltage signal $V_B$ is not easily to be influenced by the frequency of the system because of the base voltage $V_A$. Therefore, whether the frequency of the system increases or decreases, the reset signal $S_R$ ensures that there is enough spare time to separate the transitions of states for the gate signal $V_G$ and the detection signal $V_{DET}$ for the safety of the system.

Figure 6:
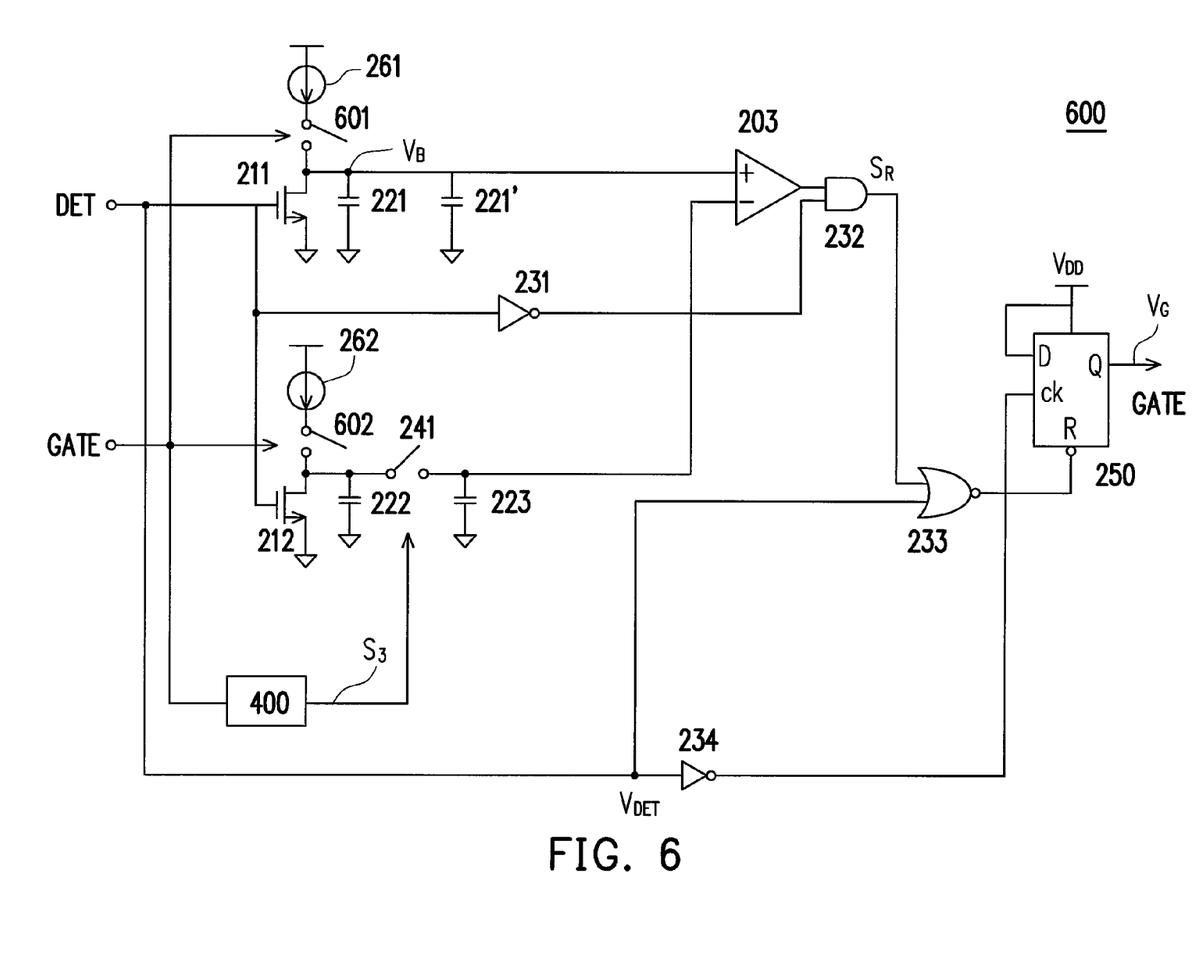
FIG. 6 shows a control circuit in the power converter according to another embodiment of the invention.

Another embodiment of this invention, shown in FIG. 6, is related to integrate time expansion function into an SR controller. FIG. 6 shows a control circuit in the power converter according to another embodiment of the invention. In other words, a control circuit 600 in FIG. 6 shows another example of the control circuit 20 at FIG. 1 in the embodiment of the present invention. Please referring to FIG. 6 and comparing with FIG. 2, the first voltage generation circuit is removed the first buffer 201 and the first node of the first switch 211 and one end of the first capacitor 221 is connecter to ground. The first voltage generation circuit further includes a switch 601 controlled by the gate voltage $V_G$ and an adjustment capacitor 221'. Instead of the second switching signal $S_2$, the detection voltage $V_{DET}$ is applied to the control node of the first switch 211 and the control node of the second switch 212. The capacitor 221' is connected to one terminal of the first capacitor 221 to provide capacitance adjustment for the first capacitor 221. The second voltage generation circuit further includes a switch 602 controlled by the gate voltage $V_G$. One end of the clearing circuit 400 is connected to one end of a sixth switch 601 and one end of a seventh switch 602, and another end of the clearing circuit 400 is connected to the third switch 241 for providing a third switching signal $S_3$ to control the third switch 241. One end of the sixth switch 601 is connected to the first current source 261, and another end of the sixth switch 601 is connected to the drain of the first switch 211. One end of the seventh switch 602 is connected to the second current source 262, and another end of the seventh switch 602 is connected to the second switch 212. The capacitor 221' can regulate the equivalent capacitance of the control circuit 600 to result in an expanded open time of the gate signal $V_G$. The GATE terminal is connected to the clearing circuit 400 and to the switches 601 and 602 for controlling. In this embodiment, the first voltage generation circuit further includes the sixth switch 601 and the capacitor 221', and the second voltage generation circuit further includes the seventh switch 602. In addition, the logic circuit further includes the inverter 234 in this embodiment.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power converter, comprising:
   a power transformer configured to transform an input voltage into a switching voltage;
   a rectifier diode and a synchronization switch, one node of the rectifier diode and a first node of the synchronization switch are coupled to a secondary side of the power transformer, and the other node of the rectifier diode and a second node of the synchronization switch are coupled to an output node of the power converter; and
   a control circuit coupled to the rectifier diode and the synchronization switch which is configured to generate a gate signal to control on and off states of the synchronization switch in responsive to a detection signal received from the secondary side of the power transformer, so that an output of the power converter is generated in accordance with the switching voltage and the gate signal,
   wherein the control circuit comprising:
   a comparison circuit coupled to a first voltage generation circuit and a second voltage generation circuit which is configured to compare a voltage signal generated by the first voltage generation circuit and a comparison signal generated by the second voltage generation circuit to output a comparison result; and
   a logic circuit, coupled to the comparison circuit which is configured to output the gate signal in accordance with the detection signal and the comparison result, wherein the comparison circuit comprising:
   a comparator, a positive input terminal of the comparator is connected to an output node of the first voltage generation circuit, a negative input terminal of the comparator is connected to an output node of a second buffer,
   wherein the comparator compares the voltage signal and the comparison signal, and outputs the comparison result to the logic circuit.

2. The power converter as claimed in claim 1, wherein the control circuit comprising a detection terminal coupled to the one node of the rectifier diode, and an gate terminal coupled to a control node of a synchronization switch, the control circuit generates the gate signal at the gate terminal to control on and off states of the synchronization switch in responsive to the received detection signal at the detection terminal.

3. The power converter as claimed in claim 1, wherein the control circuit further comprising:

a sampling circuit configured to receive the detection signal and output a first switching signal in accordance with the detection signal;

a clearing circuit configured to receive the first switching signal and output a second switching signal in accordance with the first switching signal, wherein the first voltage generation circuit configured to generate the voltage signal in accordance with the second switching signal and the second voltage generation circuit coupled to the first voltage generation circuit which is configured to generate the comparison signal in accordance with the first switching signal and the second switching signal.

4. The power converter as claimed in claim 3, wherein the logic circuit comprising:

a first AND gate, a first input terminal of the first AND gate is connected to an output node of the comparison circuit;

a first inverter, the detection voltage is applied to an anode node of the first inverter, and a cathode node of the first inverter is connected to a second input terminal of the first AND gate;

a NOR gate, a first input terminal of the NOR gate is connected to an output node of the first AND gate, and the detection voltage is applied to an second input terminal of the NOR gate; and a flip-flop, a reset terminal of the flip-flop is connected to an output node of the NOR gate, a clock terminal of the flip-flop is connected to the cathode node of the first inverter, and the gate signal is generated by an output terminal of the flip-flop.

5. The power converter as claimed in claim 3, wherein the sampling circuit comprising:

a second inverter and a fourth switch, the detection signal is transmitted to a control node of the fourth switch through the second inverter;

a third current source, connected to the first node of the fourth switch;

a third inverter, a first node of the third inverter is connected to the third current source; and a second AND gate, a second node of the third inverter is connected to a first input terminal of the second AND gate, the detection signal is transmitted to a second input terminal of the second AND gate, and the first switching signal is generated by the output node of the second AND gate.

6. The power converter as claimed in claim 3, wherein the clearing circuit comprising:

a fourth inverter, a fifth inverter and a fifth switch, the first switching signal is transmitted to a control node of the fifth switch through the fourth inverter and the fifth inverter;

a fourth current source, connected to the first node of the fifth switch;

a sixth inverter, a first node of the sixth inverter is connected to the fourth current source; and a third AND gate, a second node of the sixth inverter is connected to a first input terminal of the third AND gate, a second input terminal of the third AND gate is connected to a second node of the fourth inverter, and the second switching signal is generated by the output node of the third AND gate.

7. The power converter as claimed in claim 3, wherein the first voltage generation circuit comprising:

a first buffer, a base voltage is applied to a positive input terminal of the first buffer, and a negative input terminal of the first buffer is connected to an output terminal of the first buffer;

a first switch, a first node of the first switch is connected to the output terminal of the first buffer, and the second switching signal is applied to a control node of the first switch; and a first current source, connected to a second node of the first switch; and a first capacitor, one end of the first capacitor is connected to the first current source as an output node of the first voltage generation circuit, the other end of the first capacitor is connected to the first node of the first switch and the output terminal of the first buffer.

8. The power converter as claimed in claim 7, wherein the second voltage generation circuit comprising:

a second switch, the second switching signal is applied to a control node of the second switch;

a second current source, connected to a second node of the first switch;

a second capacitor, one end of the second capacitor is connected to the second current source;

a third switch, one terminal of a third switch is connected to second current source, and the first switching signal is applied to a control node of the third switch;

a third capacitor, connected to another terminal of the third switch; and a second buffer, a positive input terminal of the second buffer is connected to the third capacitor, and a negative input terminal of the second buffer is connected to an output terminal of the second buffer.

9. The power converter as claimed in claim 8, wherein the second voltage generation circuit further comprising:

a first resistor, one terminal of the first resistor is connected to the output terminal of the second buffer, and the other terminal of the first resistor is connected to a negative input terminal of the comparator as an output node of the second voltage generation circuit; and a second resistor, one terminal of the second resistor is connected to the other terminal of the first resistor and the negative input terminal of the comparator.

10. The power converter as claimed in claim 1, further comprising:

a power switch, a first node of the power switch is connected to a primary side of the power transformer, a second node of the power switch is connected to ground, and a drive signal is coupled to a control node of the power switch to control on and off states of the power switch.

11. The power converter as claimed in claim 1, further comprising:

a bulk capacitor, one terminal of the bulk capacitor is connected to a primary side of the power transformer, and the other terminal of the bulk capacitor is connected to ground.

12. The power converter as claimed in claim 1, further comprising:

an output capacitor, one terminal of the output capacitor is connected to the output node of the power converter, and the other terminal of the output capacitor is connected to ground.

13. A power converter, comprising:

a power transformer configured to transform an input voltage into a switching voltage;

a rectifier diode and a synchronization switch, one node of the rectifier diode and a first node of the synchronization switch are coupled to a secondary side of the power transformer, and the other node of the rectifier diode and a second node of the synchronization switch are coupled to an output node of the power converter; and a control circuit coupled to the rectifier diode and the synchronization switch which is configured to generate a gate signal to control on and off states of the synchronization switch in responsive to a detection signal received from the secondary side of the s power transformer so that an output of the s power converter is generated in accordance with the switching voltage and the gate signal, wherein the control circuit comprising:

a clearing circuit configured to receive a gate signal and output a third switching signal in accordance with the gate signal;

a first voltage generation circuit configured to generate a voltage signal in accordance with the gate signal and the detection signal;

a second voltage generation circuit configured to generate a comparison signal in accordance with the detection signal;

a comparison circuit coupled to the first voltage generation circuit and the second voltage generation circuit which is configured to compare the voltage signal with the comparison signal to output a comparison result; and a logic circuit, coupled to the comparison circuit which is configured to output the gate signal in accordance with the detection signal and the comparison result.

14. The power converter as claimed in claim 13, wherein the first voltage generation circuit comprising:

a first switch and a sixth switch, the detection voltage is applied to a control node of the first switch, the gate voltage is applied to a control node of the sixth switch, and a first node of the first switch is connected to the first node of the sixth switch;

a first current source, connected to a second node of the sixth switch; and a first capacitor, one end of the first capacitor is connected to the first node of the first switch as an output node of the first voltage generation circuit to generate a voltage signal.

15. The power converter as claimed in claim 14, wherein the first voltage generation circuit further comprising:

an adjustment capacitor coupled to the first node of the first switch which is configured to provide capacitance adjustment for the first capacitor.

16. The power converter as claimed in claim 13, wherein the second voltage generation circuit comprising:

a second switch and the seventh switch, the detection voltage is applied to a control node of the second switch, the gate voltage is applied to a control node of the seventh switch, and a first node of the second switch is connected to the first node of the seventh switch, a second current source, connected to a second node of the seventh switch;

a second capacitor, one end of the second capacitor is connected to the first node of the second switch, a third switch, one terminal of a third switch is connected to the first node of the second switch, and the third switching signal is applied to a control node of the third switch;

a third capacitor, connected to another terminal of the third switch as an output node of the first voltage generation circuit to generate the comparison signal.

17. The power converter as claimed in claim 13, wherein the comparison circuit comprising:

a comparator, a positive input terminal of the comparator is connected to an output node of the first voltage generation circuit, a negative input terminal of the comparator is connected to an output node of a second buffer, wherein the comparator compares the voltage signal and the comparison signal, and outputs the comparison result to the logic circuit.

18. The power converter as claimed in claim 13, wherein the logic circuit comprising:

an first AND gate, a first input terminal of the first AND gate is connected to an output node of the comparison circuit;

a first inverter, the detection voltage is applied to an anode node of the first inverter, and a cathode node of the first inverter is connected to a second input terminal of the first AND gate;

a NOR gate, a first input terminal of the NOR gate is connected to an output node of the first AND gate, and the detection voltage is applied to an second input terminal of the NOR gate; and a flip-flop, a reset terminal of the flip-flop is connected to an output node of the NOR gate, a clock terminal of the flip-flop is connected to the cathode node of the first inverter, and the gate signal is generated by an output terminal of the flip-flop.

19. The power converter as claimed in claim 13, further comprising:

a power switch, a first node of the power switch is connected to a primary side of the power transformer, a second node of the power switch is connected to ground, and a drive signal is coupled to a control node of the power switch to control on and off states of the power switch.

20. The power converter as claimed in claim 13, further comprising:

a bulk capacitor, one terminal of the bulk capacitor is connected to a primary side of the power transformer, and the other terminal of the bulk capacitor is connected to ground.

21. The power converter as claimed in claim 13, further comprising:

an output capacitor, one terminal of the output capacitor is connected to the output node of the power converter, and the other terminal of the output capacitor is connected to ground.

22. A method for controlling a power converter, comprising:

receiving a detection signal from the secondary side of the power transformer and generating a first switching signal in accordance with the detection signal;

generating a second switching signal in accordance with the first switching signal;

generating a voltage signal in accordance with the second switching signal;

generating a comparison signal in accordance with the first switching signal and the second switching signal;

comparing the voltage signal and the comparison signal to output a comparison result; and generating a gate signal in accordance with the detection signal and the comparison result to control on and off states of a synchronization switch, wherein a first node of the synchronization switch is coupled to a secondary side of the power transformer, a second node of the synchronization switch is coupled to an output node of the power converter, and the gate signal is applied to a control node of the synchronization switch.

* * * * *